United States Patent [19]
Kruse

[11] 3,899,013
[45] Aug. 12, 1975

[54] SAFETY TIRE TREAD INSERT

[76] Inventor: Henry E. Kruse, 23 Powder Horn Dr., Wayne, N.J. 07470

[22] Filed: June 8, 1973

[21] Appl. No.: 368,179

[52] U.S. Cl. ............... 152/208; 152/176; 152/210
[51] Int. Cl.² ................... B60C 11/02; B60C 11/14
[58] Field of Search .......... 152/175, 176, 208, 210, 152/211, 212, 219, 221, 222

[56] References Cited
UNITED STATES PATENTS

| | | | |
|---|---|---|---|
| 952,014 | 3/1910 | Morris | 152/210 |
| 2,254,329 | 9/1941 | Stephens | 152/176 |
| 2,572,996 | 10/1951 | Dunlap | 152/210 |
| 3,230,998 | 1/1966 | Del Cegno | 152/176 |
| 3,559,710 | 2/1971 | Deslauriers | 152/176 |

Primary Examiner—Drayton E. Hoffman
Attorney, Agent, or Firm—Berman, Bishoff & Platt

[57] ABSTRACT

A safety tire tread insert for providing additional traction is disclosed herein. The insert has a dovetail shape and is fitted into a dovetail shaped groove in the tire tread so as to resist expulsion therefrom. The insert may have many other cross-sectional shapes to assist in locking the insert into the tire tread. The insert is formed as a complete circle or as a strip with locking ends with the circle or the strip placed under tension while being inserted so as to contract into position. The inserts may be held exclusively by their shape so as to be replaceable when worn out or may be cemented into position to become a part of the tire. The inserts may be made of tread rubber or of tread rubber containing a mineral abrasive material for increased traction.

2 Claims, 7 Drawing Figures

PATENTED AUG 12 1975  3,899,013
FIG. 1.
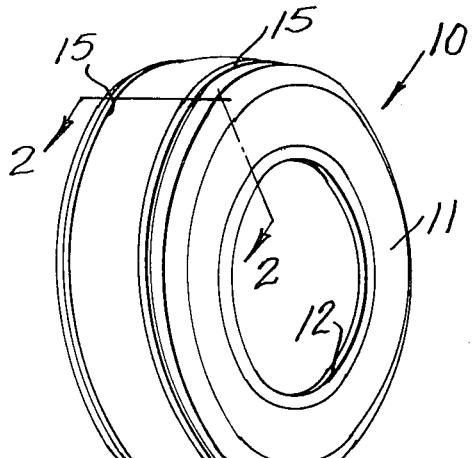
FIG. 2.
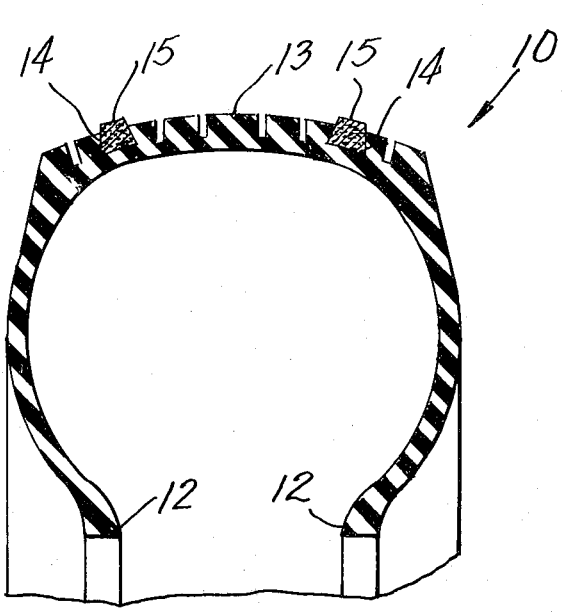
FIG. 3.
FIG. 6.
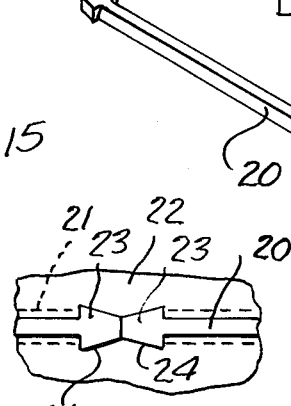
FIG. 5.
FIG. 4.
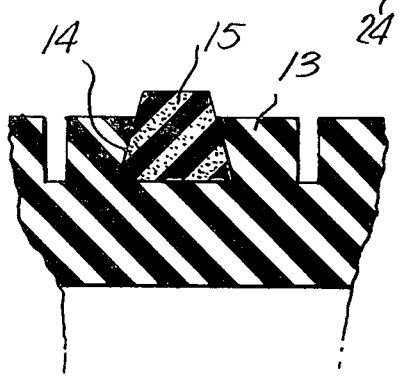
FIG. 7.
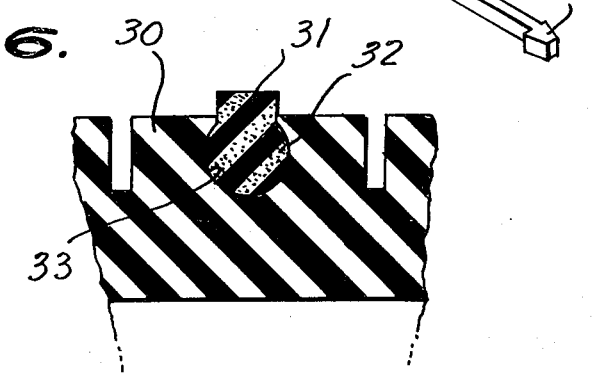

SAFETY TIRE TREAD INSERT

BACKGROUND OF THE INVENTION

FIELD OF THE INVENTION

The present invention relates to pneumatic tires with insertable tread elements.

SUMMARY OF THE INVENTION

The present invention relates to a pneumatic tire having circumferential grooves in which the base of the groove has a width substantially greater than the top of the groove in the form of a dovetail or any other desired shape to receive a tread ring having a similar shape so as to be locked in the groove after insertion. The tread ring may be split with its ends similarly locked together and the tread ring may also be cemented in place if desired. The tread ring is formed of tread rubber or of tread rubber with a mineral abrasive material distributed therethrough to increase the traction of the tire with the surface.

The primary object of the invention is to provide an insertable tread element for automotive tires.

Other objects and advantages will become apparent in the following specification when considered in light of the attached drawings.

The present invention serves as a tire safety device to prevent and reduce skidding, slipping and sliding on ice, snow and/or slick or wet pavement.

FIG. 1 is a perspective view of the invention;

FIG. 2 is an enlarged fragmentary transverse sectional view taken along the line 2—2 of FIG. 1, looking in the direction of the arrows;

FIG. 3 is a perspective view of one of the tread rings removed from the tire;

FIG. 4 is an enlarged fragmentary transverse sectional view of one of the tread rings in place in the tire;

FIG. 5 is a perspective view of a modified form of the invention;

FIG. 6 is a fragmentary top plan view of the structure illustrated in FIG. 5; and FIG. 7 is a view similar to FIG. 4 of a modified form of the invention showing a modified cross-section of the tread ring.

DESCRIPTION OF THE PREFERRED EMBODIMENT

Referring now to the drawings in detail wherein like reference characters indicate like parts throughout the several figures, the reference numeral 10 indicates generally a pneumatic tire with inserted tread elements.

The tire 10 includes a conventional carcass 11 having opposed beads 12 and a tread portion 13 forming a part thereof. The tread 13 has a pair of circumferential spaced parallel dovetail shaped grooves 14 which are widest at their inner ends and narrowest at their juncture with the surface of the tread 13.

A tread ring 15 is mounted in each of the grooves 14 and has a cross-sectional shape corresponding to that of the groove 14. The tread ring 15 has a height such that it extends above the surface of the tread 13, as can be clearly seen in FIGS. 2 and 4.

The tread ring 15 is formed of conventional tread rubber or of conventional tread rubber with a mineral abrasive material distributed therethrough to increase the traction of the tire.

In the use and operation of the invention, the pneumatic tire 10 is in deflated condition and the ring 15 is stretched to permit it to overlie the tread 13 and to be inserted in the groove 14. Upon the release of tension on the ring 15, it seats in the groove 14 and as air is added to the tire 10, the ring 15 becomes firmly fixed to the tire 10. When desired, cement may be used to bond the ring 15 to the tire tread 13.

In FIGS. 5 and 6, a modified form of the invention is illustrated wherein a dovetail-shaped strip 20 is adapted to be seated in a dovetail-shaped groove 21 in a tire tread 22. The strip 20 has dovetail heads 23 on each end thereof and the dovetail heads 23 are adapted to seat in dovetail recesses 24, as shown in FIG. 6, to lock the strip 20 to the tread 22.

The strip 20 is stretched for insertion in the groove 21 and then released to seat itself therein. Cement may be used to bond the strip 20 to the tread 22 when desired. The strip 20 may have abrasive material distributed therethrough when desired.

In FIG. 7, a tire tread 30 is illustrated with an insertable tread element 31 inserted therein. The insertable tread element 31 may either be a ring or a strip as desired and has a body shape with a circular cross section, as illustrated at 32, to fit the circular cross section 33 of the groove in the tire tread 30. It should be emphasized that while the ring 15 has a dovetail shape as well as the strip 20 and the insertable element 31 has a circular base section, the strip or ring may have any desired shape which will tend to lock the ring or strip to the tire tread.

The groove 14 and insert 15 can be used on all tires regardless of tread type, i.e. standard, mud, snow, etc., and/or tire construction or material, i.e. conventional, radial, belted, rubber, nylon, rayon, etc.

Having thus described the preferred embodiment of the invention, it should be understood that numerous structural modifications and adaptations may be resorted to without departing from the spirit of the invention.

What is claimed is:

1. A combination pneumatic tire and insert tread element comprising a pneumatic tire casing having a tire tread formed thereon, a circumferential groove formed in said tire tread and having a transverse cross-section with the inner portion of said groove wider than the outer portion thereof, a rubber tread ring seated in said groove and having a crosssectional shape to lockingly fit said groove with the outer surface of the ring protruding outwardly from the tire, said ring being formed of tread rubber having a mineral abrasive material uniformly distributed therethrough, so as to present its outer surface as a continuous, ring-like, ground engaging, abrasive friction surface having substantial breadth, said rubber ring being split with the opposite ends thereof provided with enlarged heads, and the groove in said tire being provided with complementary shaped recesses locking with said enlarged heads.

2. The combination recited in claim 1 wherein said enlarged heads are formed of dovetail shape with laterally protruding portions.

* * * * *